United States Patent
Petitjean et al.

(10) Patent No.: US 7,670,056 B2
(45) Date of Patent: Mar. 2, 2010

(54) STEPPED OUTER DIAMETER SEMI-FLOATING BEARING

(75) Inventors: Dominque Petitjean, Jullenrupt (FR); Phillipe Arnold, Henncourt (FR); Guillaumo Dupont, Villers sur marne (FR); Anthony Ruquert, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 425 days.

(21) Appl. No.: 11/689,753

(22) Filed: Mar. 22, 2007

(65) Prior Publication Data

US 2008/0232729 A1    Sep. 25, 2008

(51) Int. Cl.
F16C 33/10 (2006.01)
F16C 33/02 (2006.01)
F16C 17/00 (2006.01)

(52) U.S. Cl. ................. 384/284; 384/322; 384/286; 384/287; 384/602

(58) Field of Classification Search ........... 384/107, 384/112, 114, 291, 302, 322, 368, 906, 286–287, 384/603–606; 417/407; 29/898.025
See application file for complete search history.

(56) References Cited

U.S. PATENT DOCUMENTS

| | | | |
|---|---|---|---|
| 3,043,636 A * | 7/1962 | MacInnes et al. | ........... 384/287 |
| 3,056,634 A * | 10/1962 | Woollenweber, Jr. et al. | ........... 384/287 |
| 3,411,706 A * | 11/1968 | Woollenweber, Jr. et al. | ........... 417/407 |
| 3,811,741 A * | 5/1974 | McInerney et al. | ........... 384/291 |
| 3,941,437 A | 3/1976 | MacInnes et al. | |
| 3,969,804 A * | 7/1976 | MacInnes et al. | ...... 29/888.025 |
| 5,094,587 A * | 3/1992 | Woollenweber | ............. 415/205 |
| 5,169,242 A * | 12/1992 | Blase et al. | ................... 384/99 |
| 6,017,184 A * | 1/2000 | Aguilar et al. | ............. 415/112 |
| 6,032,466 A * | 3/2000 | Woollenweber et al. | ....... 60/607 |
| 6,220,829 B1 * | 4/2001 | Thompson et al. | ........... 417/407 |
| 6,250,897 B1 * | 6/2001 | Thompson et al. | ........... 417/407 |
| 6,935,849 B2 * | 8/2005 | Gutknecht | ................... 417/407 |

* cited by examiner

*Primary Examiner*—Marcus Charles
(74) *Attorney, Agent, or Firm*—Brian Pangrle

(57) ABSTRACT

An exemplary bearing assembly for a turbocharger includes a center housing with a bearing bore having a bearing bore turbine end radius and an inlet for lubricant and a unitary bearing disposed in the bearing bore and forming an outer lubricant film between the bearing and the bearing bore wherein the bearing includes a central axis, an internal bore to receive a shaft extending between a compressor end and a turbine end of the bearing and forming an inner lubricant film between the internal bore and the shaft, a locating mechanism between axial ends of the bearing to prevent rotation and translation of the bearing within the bearing bore and a turbine end protrusion wherein the protrusion comprises a radius that exceeds the bearing bore turbine end radius to thereby deflect lubricant from the outer lubricant film layer radially outward. Other exemplary technologies are also disclosed.

15 Claims, 7 Drawing Sheets

STEPPED OUTER DIAMETER SEMI-FLOATING BEARING

FIELD OF THE INVENTION

Subject matter disclosed herein relates generally to bearings for turbochargers and, in particular, to bearings that include an outer diameter that exceeds a center housing bore diameter.

BACKGROUND

Exhaust gas driven turbochargers include a rotating shaft carrying a turbine wheel and a compressor wheel, which is rotatably supported within a center housing by one or more lubricated bearings (e.g., oil lubricated). During operation, exhaust gas from an internal combustion engine drives a turbocharger's turbine wheel, which, in turn, drives the compressor wheel to boost charge air to the internal combustion engine. Through proper bearing lubrication, a turbocharger's rotating assembly can readily withstand rotational speeds in excess of 100,000 rpm.

Leakage of bearing lubricant can cause some problems. For example, at the turbine end, lubricant can enter the exhaust stream and thereby affect emissions and/or aftertreatment technology. At the compressor end, lubricant can enter the intake stream and enter the engine and/or foul component such as an inter-cooler's heat exchange surface.

In some instances, a bearing provides one or more thrust surfaces for axial loads. For example, axial loading of a rotating assembly may cause a surface of an integral shaft and turbine wheel to approach a surface of a bearing. In general, clearances and lubricant create a protective layer such that loads may be transferred without such surfaces contacting. However, for some operational conditions, axial loading may cause the lubricant layer to diminish and hence lose its protective effect. Various exemplary technologies described herein can address such lubrication leakage and/or loading issues.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers. Turbochargers are frequently utilized to increase the output of an internal combustion engine. A turbocharger generally acts to extract energy from the exhaust gas and to provide energy to intake air, which may be combined with fuel to form combustion gas.

Figure 1:
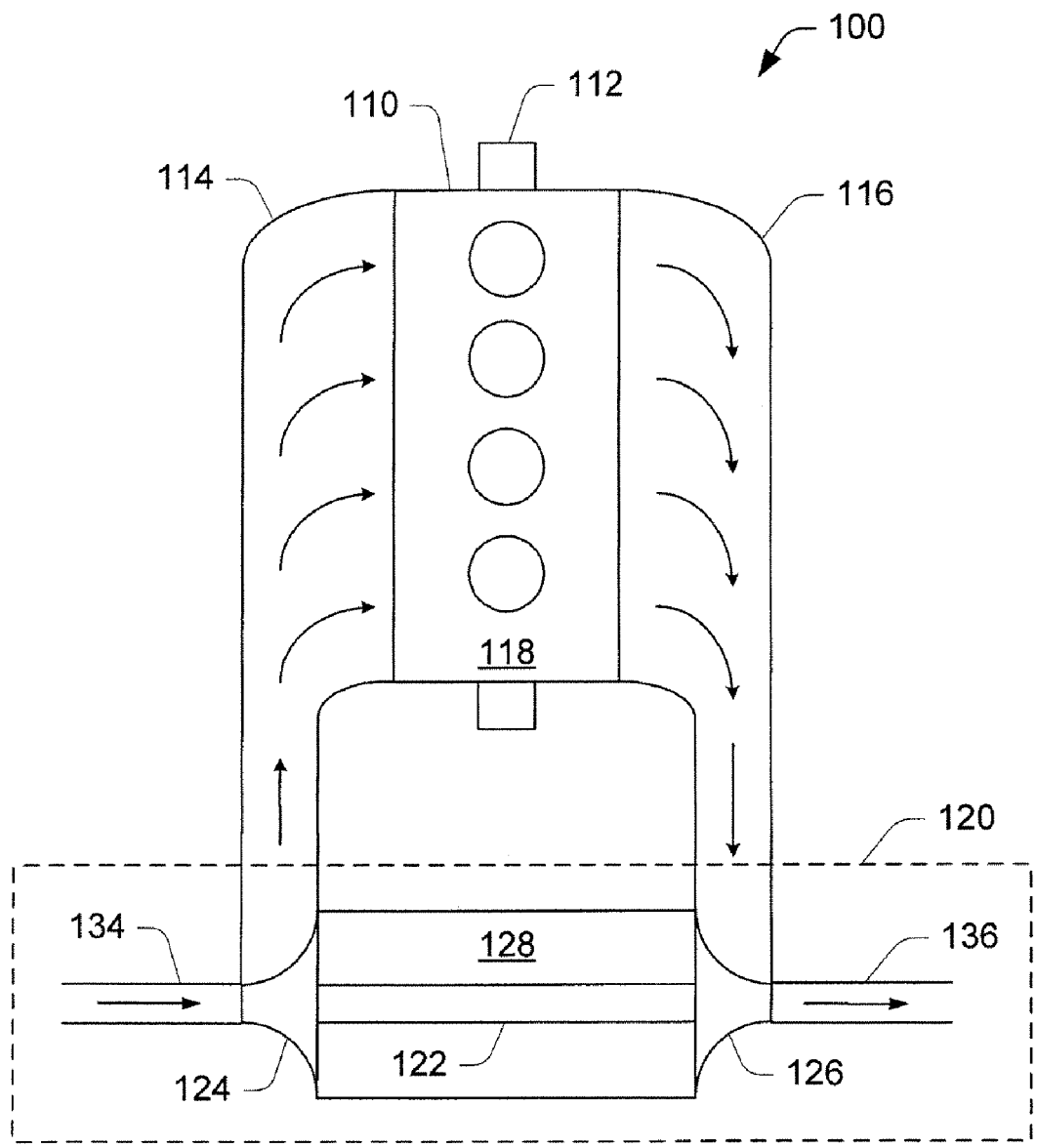
FIG. 1 is a diagram of an internal combustion engine and turbocharger system.

Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
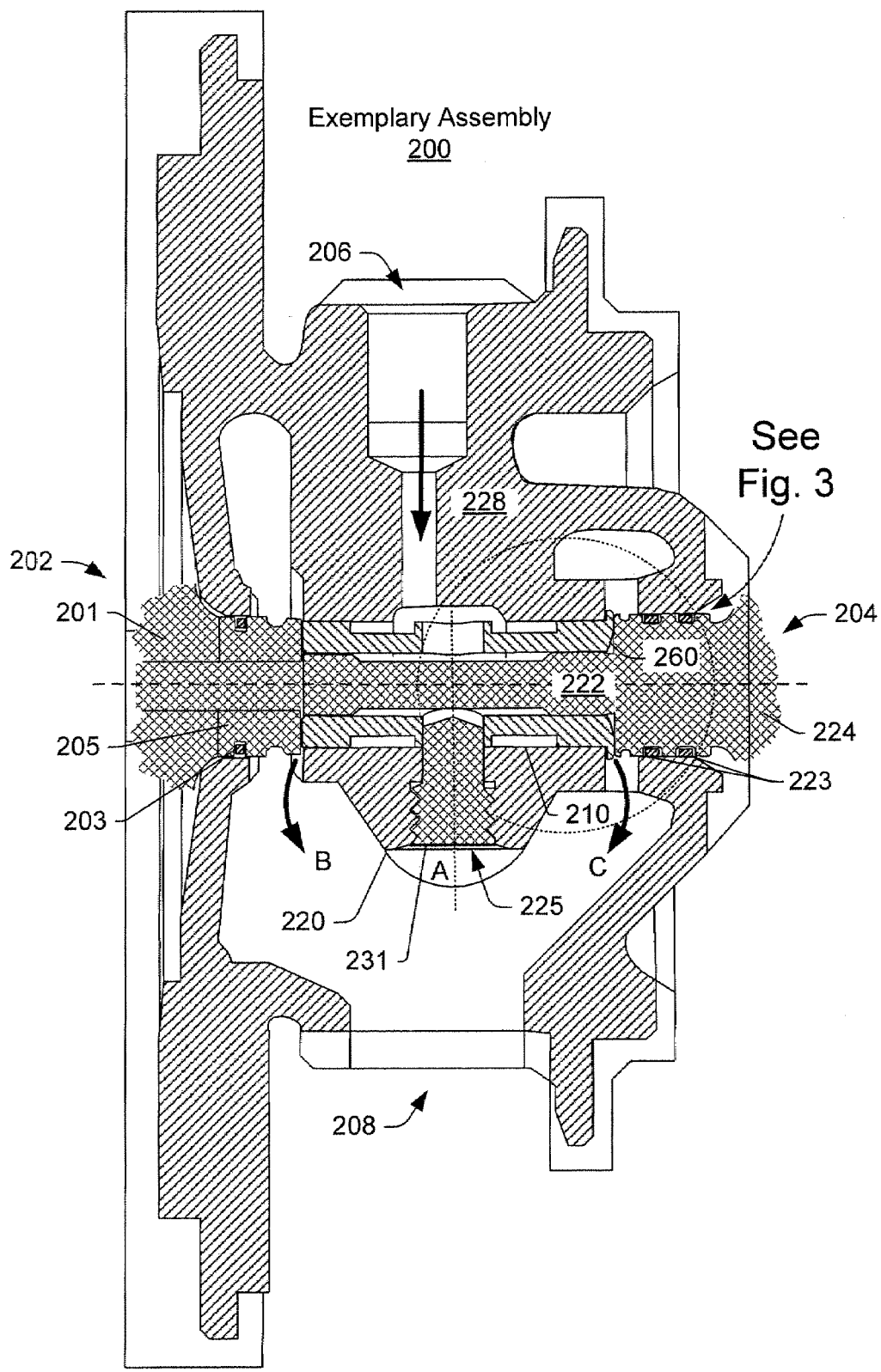
FIG. 2 is a cross-sectional view of an exemplary turbocharger center housing assembly suitable for use with the system of FIG. 1.

FIG. 2 shows an exemplary housing assembly 200 that includes a housing 228 having a compressor end 202 and a turbine end 204. In this example, the housing 228 is a center housing of a turbocharger assembly such as the housing 128 of FIG. 1. The housing 228 houses an exemplary bearing 260, which is described in more detail below.

The turbine wheel 224 and the shaft 222 may be a single component, for example, manufactured by welding a turbine to a shaft. Whether a single component or multi-component configuration is used, one or more sealing mechanisms exist to reduce leakage of lubricant from the bearing space to the turbine wheel space. For example, the turbine wheel 224 includes a pair of axially spaced grooves where each groove seats a seal ring 223. In the example of FIG. 2, the compressor wheel 201 is spaced axially from the bearing 260 by a spacer 205, which includes a groove that seats a seal ring 203. Such a seal mechanism reduces leakage of lubricant toward the compressor wheel 201.

The housing 228 includes a bearing bore 210 for the exemplary bearing 260 and a locating mechanism that includes a boss 220 with an aperture 225 for receiving a locating pin 231 that extends into the bearing bore 210. In such a manner, the exemplary bearing 260 can be constrained from rotating and translating in the bearing bore 210 of the center housing 228. In general, once arranged in conjunction with the housing 228, the bearing 260 is semi-floating and has, to some extent, freedom of movement from end to end. While the exemplary bearing 260 includes features that may, at first, appear to limit such movement, attention to desired clearances and locating mechanism(s) can provide for some end to end movement while maintaining some clearance for radial lubricant flow between the bearing and the housing at the turbine end of the assembly or, in another example, at the compressor end of the assembly. In FIG. 2, some clearance may exist between the locating pin 231 and the bearing 260.

Various features of the exemplary bearing 260 pertain to lubricant flow. In the example of FIG. 2, lubricant for the bearing 260 is supplied at an inlet pressure (e.g., depending on engine speed, etc.) through an inlet 206 of the housing 228 and lubricant may exit the housing 228 via an exit 208. More specifically, lubricant may flow via three lubricant flow paths A, B, C to the exit 208 of the housing 200. Path A is via a locating pin aperture 225, which in the example of FIG. 2 is blocked by use of a solid locating pin 231. Paths B and C are via film ends where an inner lubricant film exists between the shaft 222 and the bore surfaces of the bearing 260 and the outer surfaces of the bearing 260 and an outer lubricant film exists between the bore 210 and the outer surfaces of the bearing 260. The shaft 222, which extends through the bore of the bearing 260 may include a relieved portion that promotes lubricant flow between the shaft 222 and the bearing 260. The shaft 222 may be a single piece or a multi-piece shaft. While FIG. 2 shows the bearing 260 as a unitary bearing, an exemplary bearing may be a multi-piece bearing.

As already mentioned, paths B and C pertain to flow via film ends. However, features of the bearing 260 alter flow at the turbine end. More specifically, the bearing 260 includes a shoulder or protrusion 270 that extends radially outward at the turbine end. Such a protrusion is shown in more detail in FIG. 3 as well. The protrusion 270 impedes flow of lubricant from the outer lubricant film and thereby improves the turbine end sealing capacity of the bearing 260. The protrusion 270 directs lubricant emerging from the outer lubricant film in a radial direction. By directing lubricant away from the turbine end seal (see, e.g., seal rings 223 disposed in respective grooves of the hub end of the turbine wheel), the exemplary bearing 260 can reduce lubricant leakage. In the example of FIG. 2, the protrusion 270 directs lubricant radially outward approximately in a plane parallel to a plane defined by one of the seal rings 223. Further, the protrusion 270 can diminish the effect of outer lubricant film flow on inner lubricant film flow. Yet further, depending on the configuration of a rotating assembly (particularly with respect to axial loads at a bearing) the protrusion 270 can be used to increase thrust pad area on the turbine end.

In the example of FIG. 2, the protrusion 270 of the exemplary bearing 260 provides for better turbine end lubricant sealing and for a larger thrust pad area (e.g., from a modest increase to a 40% increase, a 100% increase or an even larger increase). In some other examples, such a protrusion may simply provide for better lubricant sealing (e.g., where the bearing end does not need to function as a thrust pad).

While the example of FIG. 2 pertains to the turbine end of the rotating assembly 200, a protrusion may be used at the compressor end. For example, the spacer 205 includes the seal ring 203 disposed in a groove. An exemplary bearing may include a compressor end protrusion that directs lubricant radially outward and thus away from the seal ring 203 (i.e., not directly toward the seal ring 203). While an assembly may include any of a variety of configurations at a compressor end or a turbine end, an exemplary protrusion may direct lubricant to reduce lubricant leakage. Generally, in the case of a turbine end protrusion or a compressor end protrusion, lubricant may be directed away from a seal or seals and thus reduce leakage of lubricant from a rotating assembly.

Figure 3:
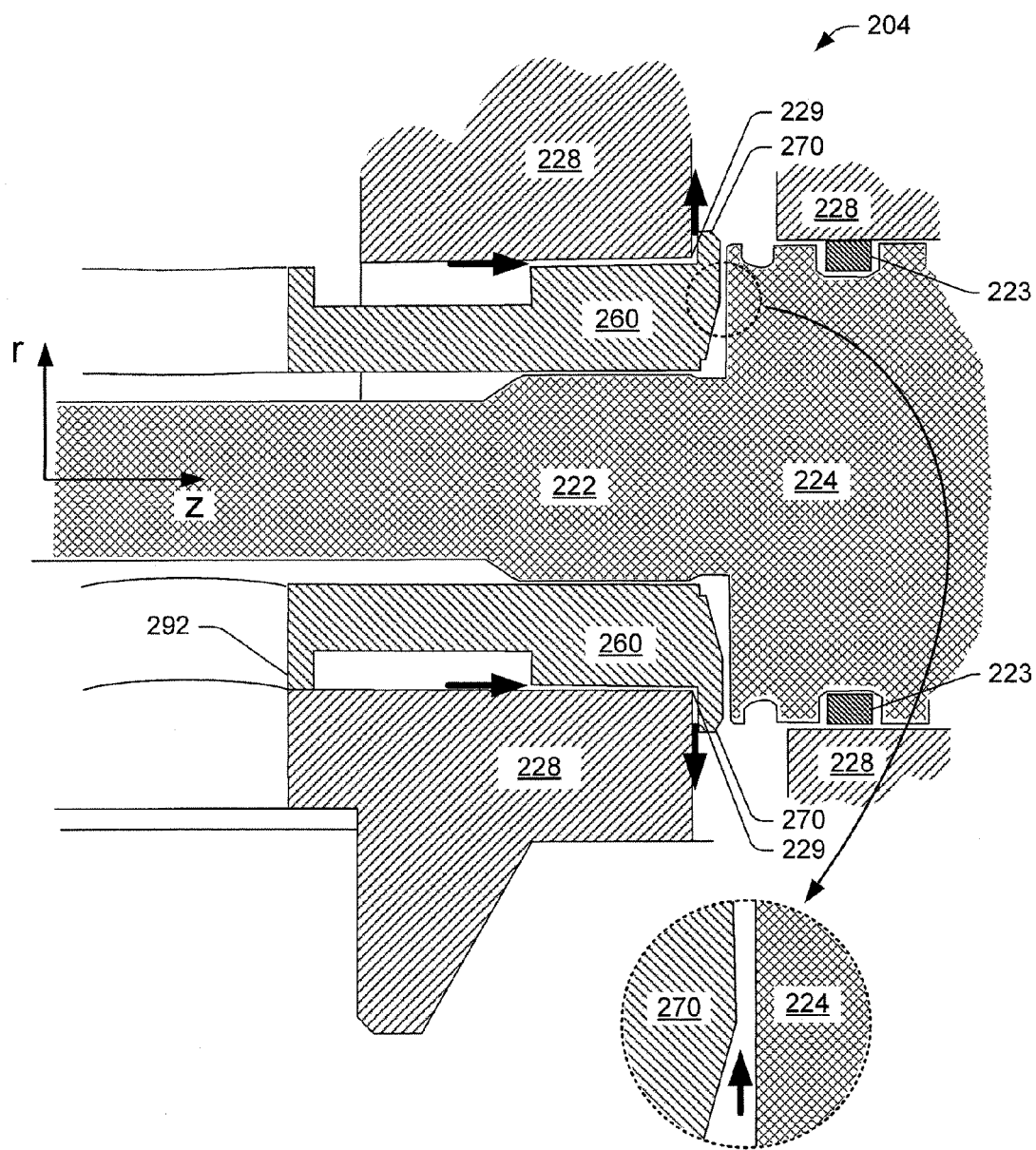
FIG. 3 is a cross-sectional view of the turbine end of the center housing assembly of FIG. 2.

FIG. 3 shows a portion of the cross-sectional view of the turbine end of the assembly 200 (without the locating pin 231 inserted) along with arrows to indicate direction of lubricant flow from the outer lubricant film axially (z-direction) along the outer surface of the bearing 260 and then radially (r-direction) along a housing side surface of the protrusion 270. More specifically, the center housing 228 includes a shoulder 229 at the turbine end of the bearing bore 210. A locating mechanism such as the pin 231 may locate the bearing (and hence the protrusion) to ensure that a clearance exists between a housing side surface of the protrusion 270 and the shoulder 229 of the housing 228.

An enlarged view of a thrust surface region between the protrusion 270 and a turbine collar of the turbine wheel 224 indicates a general direction of lubricant flow (e.g., radially outward) at the thrust surface region during operation. The inner lubricant film between the outer surface of the shaft 222 and the bore surface of the bearing 260 typically provides the thrust surface region with lubricant.

As described herein, an exemplary bearing assembly for a turbocharger may include a center housing where the center housing includes: a bearing bore that extends from a compressor end of the center housing to a turbine end of the center housing where the compressor end includes a bearing bore compressor end radius and the turbine end includes a bearing bore turbine end radius; a boss with an aperture for receiving a locating pin; and an inlet for lubricant. In this example, the assembly further includes a bearing disposed in the bearing bore where the bearing forms an outer lubricant film between the bearing and the bearing bore of the center housing. Such a bearing includes an internal bore to receive a shaft extending between a compressor end and a turbine end of the bearing where an inner lubricant film forms between the internal bore and the shaft. A locating pin may be positioned in a locating pin aperture of the bearing, for example, via the locating pin aperture of the center housing. Such a positioning mechanism acts to prevent rotation and translation of the bearing within the bearing bore.

As described herein, an exemplary bearing, whether unitary or multi-piece, includes a protrusion that, when positioned in a bearing bore of a center housing, extends radially and axially beyond the bearing bore. As shown in FIGS. 2 and 3, such a protrusion includes a radius that exceeds a respective bearing bore end radius to thereby deflect lubricant from the outer lubricant film layer radially outward. Such a protrusion may be a turbine end protrusion with a radius that exceeds a bearing bore turbine end radius or it may be a compressor end protrusion with a radius that exceeds the bearing bore compressor end radius. As shown in FIGS. 2 and 3, an exemplary end protrusion 270 extends axially beyond a bearing bore to provide a space for directing lubricant from an outer lubricant film layer radially outward.

An exemplary assembly may include a turbine wheel attached to a shaft where the turbine wheel includes a hub end surface located adjacent a surface of an exemplary protrusion of a bearing. In various examples, such a surface of the protrusion may act as a thrust surface. As described herein, a protrusion can direct lubricant from an outer lubricant film layer radially outward and away from a seal (e.g., in a plane parallel to a plane defined by a seal ring).

An exemplary assembly may include a compressor wheel attached to a shaft with a spacer disposed between the compressor wheel and a surface of an exemplary protrusion. In such an example, the surface of the protrusion may be a thrust surface. The aforementioned spacer may include a groove configured to receive a seal ring and the protrusion may direct lubricant from an outer lubricant film layer radially outward (e.g., in a plane parallel to a plane defined by the seal ring). While a spacer is mentioned, a compressor wheel may include a hub with a groove or other feature for purposes of forming a seal. In such an example, an exemplary protrusion may direct lubricant with respect to the seal and optionally act as a thrust surface for the compressor wheel.

Figure 4:
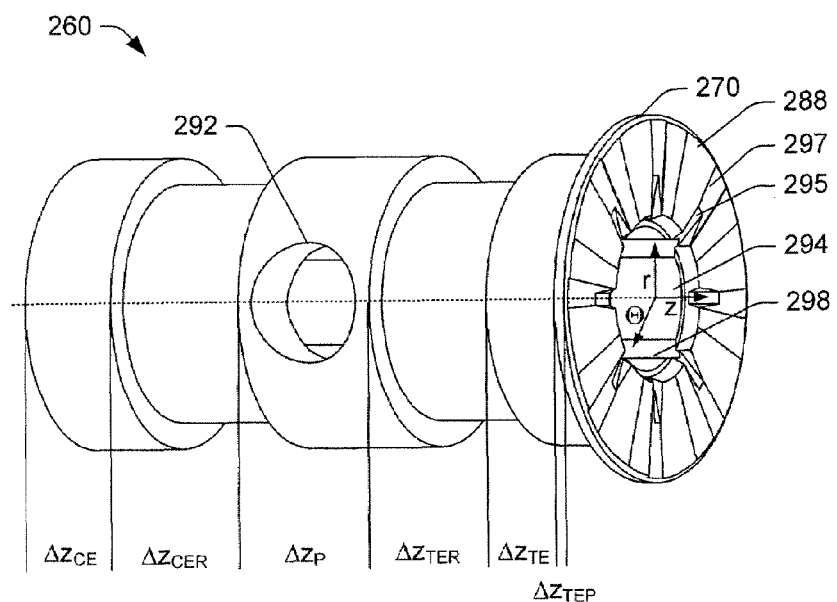
FIG. 4 is two perspective views of the exemplary bearing of the center housing assembly of FIGS. 2 and 3.
Figure 4:
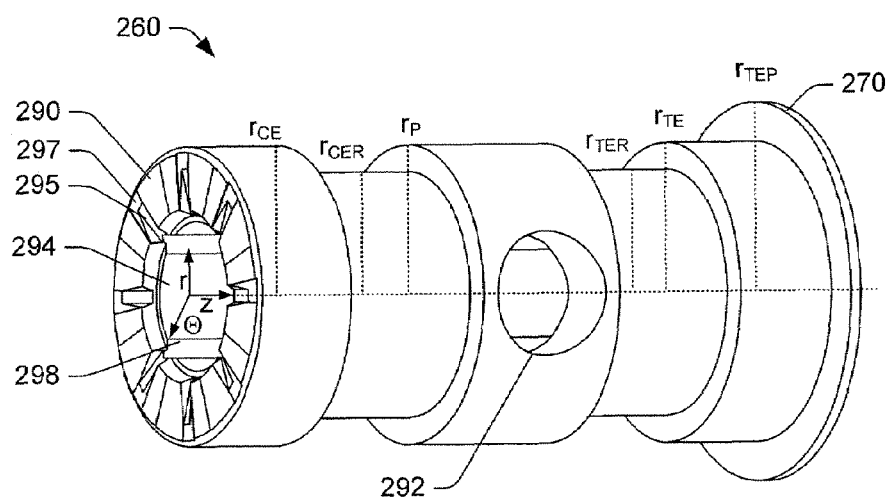

FIG. 4 shows two perspective views of the exemplary bearing 260 of FIGS. 2 and 3. A cylindrical coordinate system (r, Θ, z) is shown where the (r, z) origin is along the central axis of the bearing. Thrust surfaces 288 and 290 are located at opposite ends of the bearing. While this example includes thrust surfaces 288 at the turbine end and thrust surfaces 290 at the compressor end, a bearing may include thrust surfaces at a turbine end only or at a compressor end only or a bearing may be configured without thrust surfaces (see, e.g., exemplary bearings of FIGS. 6 and 7). When configured as a unitary bearing structure, the bearing 260 provides the minimum parts count and forces maximum parallelism of the thrust surfaces during wobbling action of the bearing. As already mentioned, an exemplary bearing may be configured as a multi-component bearing. The location of bearing aperture 292, which can receive a locating pin, allows uniform damping action of the bearing ends. In the example of FIG. 4, the aperture 292 is located centrally, however, in other examples, such an aperture may be closer to the turbine end or closer to the compressor end.

The bore 294 of the bearing extends between the thrust surfaces 288, 290 and incorporates end portions which are characterized by an enhanced surface finish for bearing support of the unrelieved portions of the shaft. Axial grooves 298 extend longitudinally along the bore surface for lubricant flow. The axial grooves additionally provide an enhancement in rotordynamics by improving resistance to subsynchronous shaft motion through reduction of oil whirl encountered in lightly loaded bearing conditions. The axial grooves may vary in dimension, location and number. In some other examples, a bearing may not include such axial grooves and/or a bearing may optionally include one or more other features that pertain to lubricant flow of motion.

The thrust surfaces 288, 290 incorporate a plurality of radial grooves 295 which provide improved thrust capacity while enhancing contamination control. In the example of FIG. 4, the bearing 260 includes eight radial grooves at each end (about 45° spacing between adjacent radial grooves) and four of the grooves align with the axial grooves 298 in the bearing bore. In the example of FIG. 4, each of the axial grooves 298 has a V-shape while each of the radial grooves 295 has a somewhat U-shape. A relief 297 on the inner periphery of each thrust surface can further enhance lubricant delivery and distribution.

FIG. 4 shows various dimensions for the bearing 260. The upper perspective view shows dimensions $\Delta z_{CE}$ as an axial distance for a compressor end thrust section, $\Delta z_{CER}$ as an axial distance for a compressor end recessed section, $\Delta z_P$ as an axial distance for a pin receiving section, $\Delta z_{TER}$ as an axial distance for a turbine end recessed section, $\Delta z_{TE}$ as an axial distance for a turbine end thrust section and $\Delta z_{TEP}$ as an axial distance for a turbine end protrusion of the turbine end thrust section. The lower perspective view shows dimensions $r_{CE}$ as a radial distance for an outer surface for a compressor end thrust section, $r_{CER}$ as a radial distance for an outer surface for a compressor end recessed section, $r_P$ as a radial distance for an outer surface for a pin receiving section, $r_{TER}$ as a radial distance for an outer surface for a turbine end recessed section, $r_{TE}$ as a radial distance for an outer surface for a turbine end thrust section and $r_{TEP}$ as a radial distance for an outer surface for a turbine end protrusion of the turbine end thrust section.

While transitions from section to section appear as approximately 90° shoulders, other types of transitions may be used. However, the turbine end protrusion typically transitions as a shoulder from a radius greater than a center housing bore radius to a radius less than the center housing bore radius of a relatively small axial distance.

As shown in FIG. 3, the protrusion 270 of the bearing 260 extends radially and axially beyond the turbine end of the center housing bearing bore 210. A locating pin received by the aperture 292 of the bearing 260 may ensure that a lubricant gap exists between the protrusion 270 and a shoulder 229 at the end of the bearing bore 210 of the housing 228. The lubricant gap may have an axial dimension that varies or remains substantially constant from the bearing bore to the end of the protrusion (e.g., to the radius of the protrusion, $r_{TEP}$).

Figure 5:
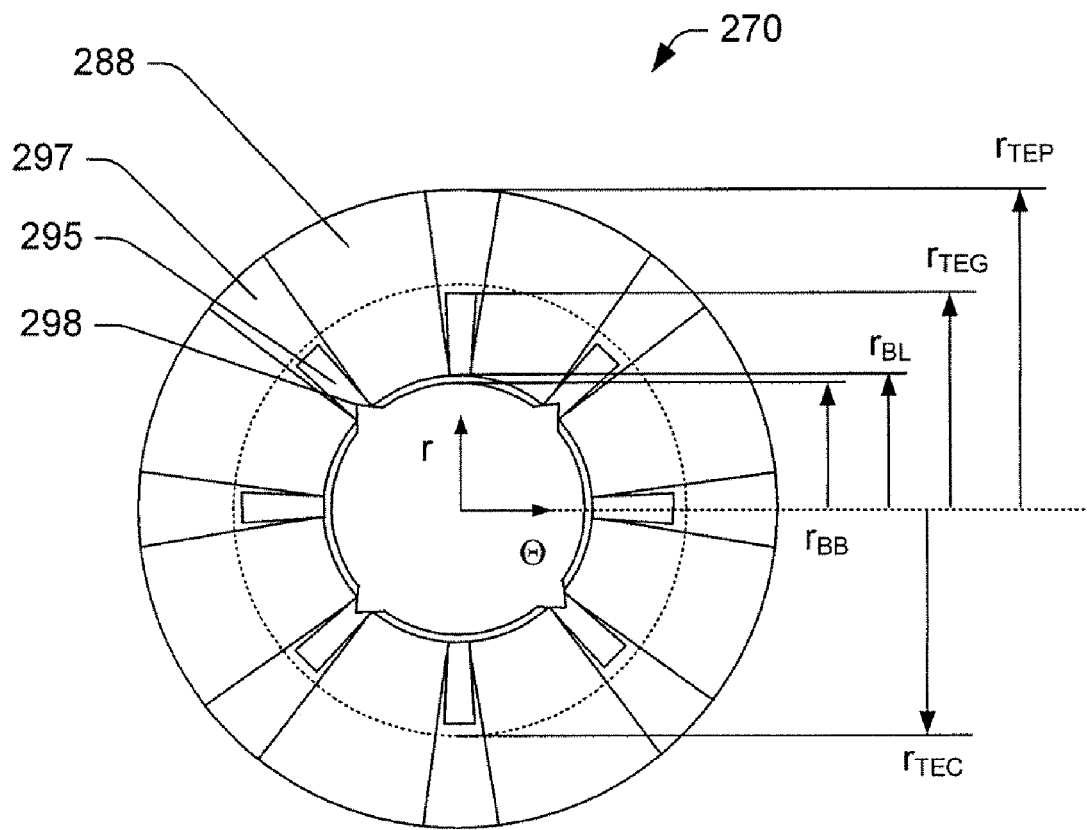
FIG. 5 is an end view of the bearing of FIG. 4.

FIG. 5 shows an end view of the protrusion 270 of the exemplary bearing 260 along with an r-Θ coordinate system. As already mentioned, the turbine end includes eight grooves where each groove 295 has an associated relief 297. The protrusion 270 includes a bearing bore radius $r_{BB}$, a bearing turbine end lip radius $r_{BL}$, a bearing turbine end groove radius $r_{TEG}$, and a bearing turbine end protrusion radius $r_{TEP}$. A conventional turbine end radius $r_{TEC}$ is also shown for comparison.

As described herein, the protrusion radius ($r_{TEP}$) and other dimensions or features may be selected to optimize turbocharger performance. Thrust area for the protrusion may be approximated as $\pi(r_{TEP}^2 - r_{BB}^2)$ while thrust area for a conventional end may be approximated as $\pi(r_{TEC}^2 - r_{BB}^2)$. The approximate percentage increase in thrust area for a turbine end protrusion may be approximated as $100*[\pi(r_{TEP}^2 - r_{BB}^2)/(r_{TEC}^2 - r_{BB}^2) - 1]$. With a protrusion, the grooves 295 and/or the reliefs 297 may extend beyond a conventional turbine end radius $r_{TEC}$. For example, one or more of the grooves 295 may extend up to the protrusion radius $r_{TEP}$, noting that a shorter groove may, in general, improve load capacity. Groove depth and/or pitch (e.g., from an outer radius $r_{TEG}$ to the bore radius $r_{BB}$ or bore lip radius $r_{BL}$) may depend in part on axial thickness of the protrusion (see, e.g., $\Delta z_{TEP}$ of FIG. 4). Again, an increased thrust area can increase the size of the lubricant layer between a bearing and another component. Hence, an increase in a bearing's thrust area can enhance the protective effect of a lubricant layer.

Figure 6:
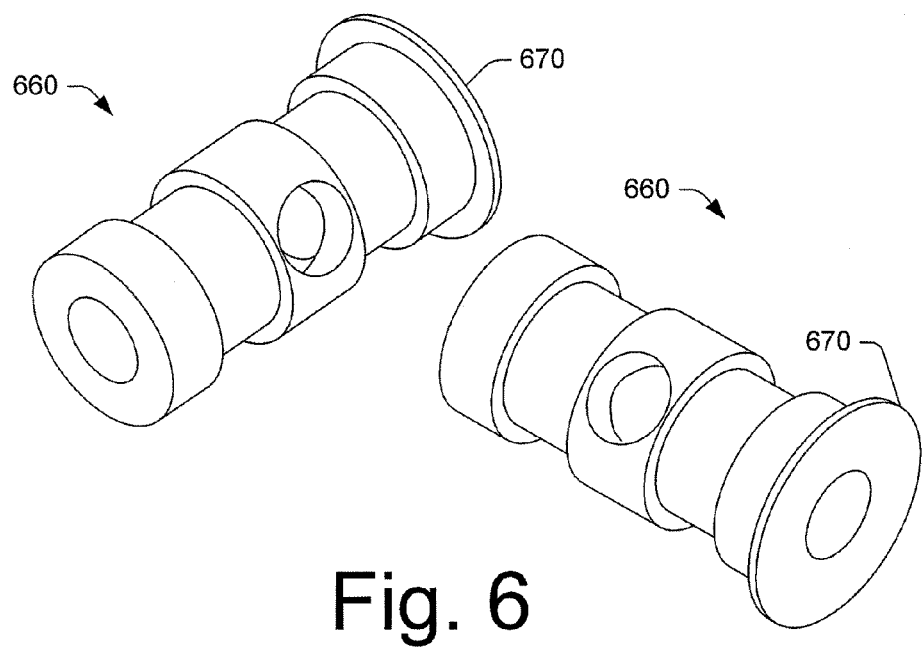
FIG. 6 is two perspective views of an exemplary bearing.
Figure 7:
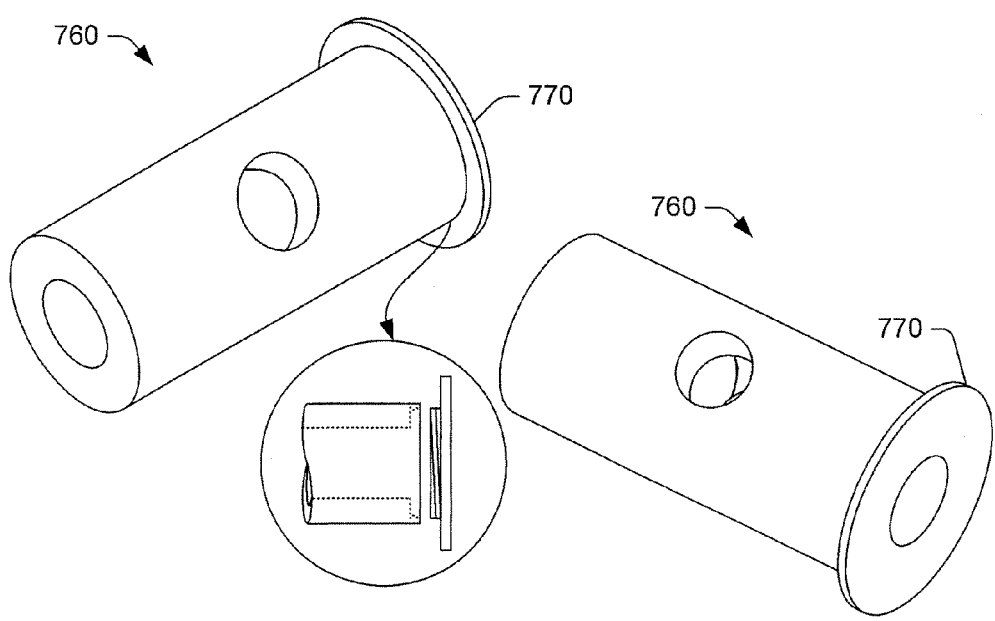
FIG. 7 is two perspective views of another exemplary bearing.

FIG. 6 shows two perspective views of an exemplary bearing 660 that includes a protrusion 670 at one end. The protrusion 670 may be located at a compressor end or at a turbine end. The protrusion 670 may be for purposes of directing lubricant and, depending on configuration of a rotating assembly, it may not function as a thrust surface. Where the protrusion 670 does not function as a thrust surface, thrust surface features, such as those of the protrusion 270, may be omitted. The bearing 660 includes a turbine end recessed section and a compressor end recessed section (see, e.g., bearing 260 of FIG. 4). In contrast, exemplary bearing 760 of FIG. 7 does not include such recessed sections. The exemplary bearing 760 includes a protrusion 770 at one end and an optional aperture that may be used as part of a locating mechanism. The protrusion 770 may be located at a compressor end or at a turbine end. The protrusion 770 may be for purposes of directing lubricant and, depending on configuration of a rotating assembly, it may not function as a thrust surface. Where the protrusion 770 does not function as a thrust surface, thrust surface features, such as those of the protrusion 270, may be omitted.

Figure 8:
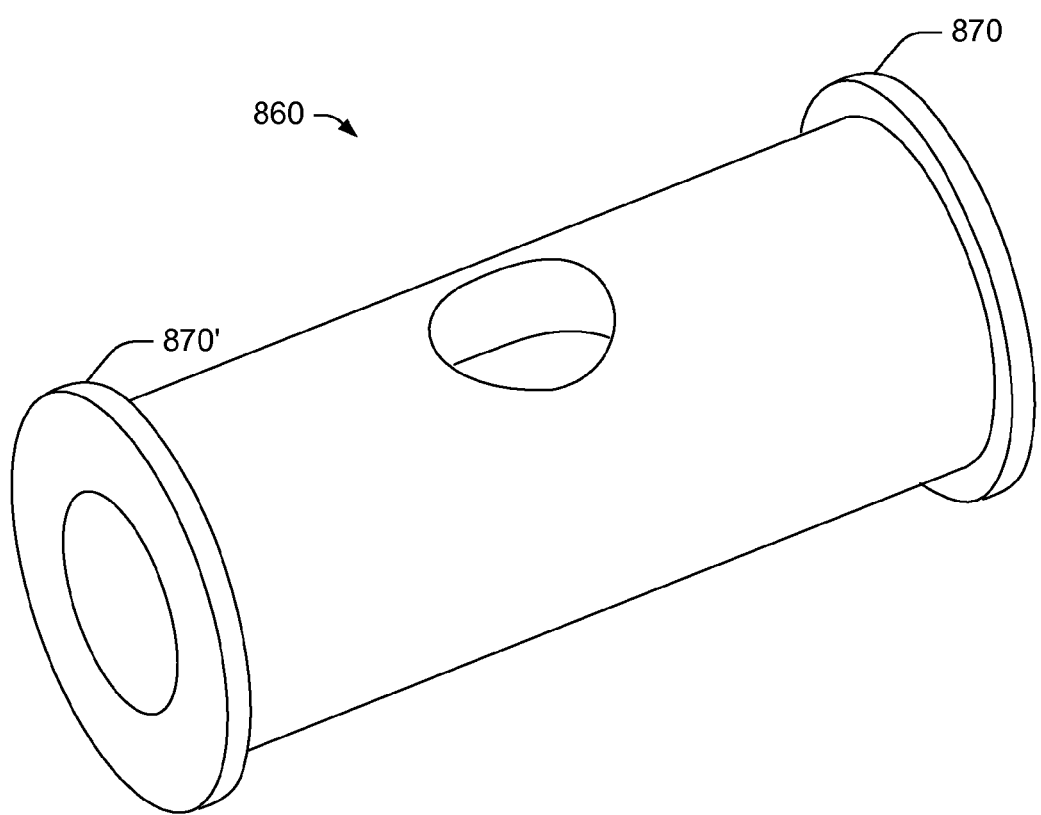
FIG. 8 is a perspective view of an exemplary bearing with two protrusions.

In general, an exemplary unitary bearing is inserted into a turbocharger bore (e.g., bore of a center housing) from either a compressor end or a turbine end. A multi-piece bearing may be capable of assembly in a different manner. For example, the bearing 760 may be a multi-piece bearing that includes a protrusion piece that attaches to a cylindrical piece. The attachment mechanism may include threads, a bayonet, pressure fit, material bonding, etc. During assembly, the cylindrical piece may be positioned in a turbocharger bore from a compressor end or a turbine end and then the protrusion piece attached at the compressor end or at the turbine end, as appropriate. In another example, shown in FIG. 8, a multi-piece bearing 860 includes protrusions at both ends 870, 870' (i.e., a compressor end protrusion and a turbine end protrusion). In such an example, one of the protrusions may be integral to a cylindrical piece while the other protrusion attaches to the cylindrical piece or both protrusions may be separate components that attach to one or more other components (e.g., a cylindrical piece, etc.).

Optimization goals may include use of a protrusion as a lubricant deflector to reduce turbine end lubricant leakage or compressor end lubricant leakage, use of a protrusion to increase thrust capacity, use of a protrusion to improve lubricant flow from an inner film (e.g., between a bearing bore and a shaft), etc.

As described herein, an exemplary protrusion can improve end sealing capacity of any bearing, for example, which does not require a snap ring or a center housing inner diameter shoulder as an axial mechanical stop mechanism. A protrusion can provide for increased pad area for Z bearings, for example, by enlarging a pad's outer diameter.

The invention claimed is:

1. A bearing assembly for a turbocharger comprising:
   a center housing that comprises
      a bearing bore that extends from a compressor end of the center housing to a turbine end of the center housing wherein the compressor end comprises a bearing bore compressor end radius and the turbine end comprises a bearing bore turbine end radius, and
      an inlet for lubricant; and
   a bearing disposed in the bearing bore and forming an outer lubricant film between the bearing and the bearing bore wherein the bearing comprises
      a central axis,
      an internal bore to receive a shaft extending between a compressor end and a turbine end of the bearing and forming an inner lubricant film between the internal bore and the shaft,
      a locating mechanism to prevent rotation and translation of the bearing within the bearing bore and
      an end protrusion that extends radially and axially beyond the bearing bore wherein the protrusion comprises a radius that exceeds a respective bearing bore end radius to thereby deflect lubricant from the outer lubricant film layer radially outward, wherein the end protrusion extends axially beyond the bearing bore to provide a space between a shoulder of the bearing bore and a side of the end protrusion for directing lubricant from the outer lubricant film layer radially outward, wherein the locating mechanism ensures the space between the shoulder of the bearing bore and the end protrusion and wherein an opposing side of the end protrusion comprises a thrust surface at a radius that exceeds the respective bearing bore end radius.

2. The bearing assembly of claim 1 wherein the end protrusion comprises a turbine end protrusion and comprises a radius that exceeds the bearing bore turbine end radius.

3. The bearing assembly of claim 1 wherein the end protrusion comprises a compressor end protrusion and comprises a radius that exceeds the bearing bore compressor end radius.

4. The bearing assembly of claim 1 wherein the bearing comprises a unitary bearing.

5. The bearing assembly of claim 1 wherein the bearing comprises a multi-piece bearing.

6. The bearing assembly of claim 5 wherein the bearing comprises an additional end protrusion at the opposing end of the bearing wherein the additional end protrusion extends radially and axially beyond the bearing bore.

7. The bearing assembly of claim 5 wherein the bearing comprises a protrusion piece, a cylindrical piece and an attachment mechanism to attach the protrusion piece to the cylindrical piece.

8. A rotating assembly for a turbocharger comprising:
   a center housing that comprises
      a bearing bore that extends from a compressor end of the center housing to a turbine end of the center housing wherein the compressor end comprises a bearing bore compressor end radius and the turbine end comprises a bearing bore turbine end radius,
      and an inlet for lubricant;
   a bearing disposed in the bearing bore and forming an outer lubricant film between the bearing and the bearing bore wherein the bearing comprises
      a central axis,
      an internal bore to receive a shaft extending between a compressor end and a turbine end of the bearing and forming an inner lubricant film between the internal bore and the shaft,
      a locating mechanism to prevent rotation and translation of the bearing within the bearing bore and
      a turbine end protrusion that extends radially and axially beyond the bearing bore wherein the protrusion comprises a radius that exceeds the bearing bore turbine end radius to thereby deflect lubricant from the outer lubricant film layer radially outward, wherein the turbine end protrusion extends axially beyond the bearing bore to provide a space between a shoulder of the bearing bore and the turbine end protrusion for directing lubricant from the outer lubricant film layer radially outward and wherein the locating mechanism ensures the space between the shoulder of the bearing bore and the turbine end protrusion;
   the shaft disposed in the bearing; and
   a turbine wheel attached to the shaft wherein the turbine wheel comprises a hub end surface located adjacent a surface of the protrusion.

9. The rotating assembly of claim 8 wherein the surface of the protrusion comprises a thrust surface.

10. The rotating assembly of claim 8 wherein the turbine wheel comprises a groove configured to receive a seal ring.

11. The rotating assembly of claim 10 wherein the protrusion directs lubricant from the outer lubricant film layer radially outward in a plane parallel to a plane defined by the seal ring.

12. A rotating assembly for a turbocharger comprising:
   a center housing that comprises
      a bearing bore that extends from a compressor end of the center housing to a turbine end of the center housing wherein the compressor end comprises a bearing bore compressor end radius and the turbine end comprises a bearing bore turbine end radius,
      and an inlet for lubricant;
   a bearing disposed in the bearing bore and forming an outer lubricant film between the bearing and the bearing bore wherein the bearing comprises
a central axis,
an internal bore to receive a shaft extending between a compressor end and a turbine end of the bearing and forming an inner lubricant film between the internal bore and the shaft,
a locating mechanism to prevent rotation and translation of the bearing within the bearing bore and
a compressor end protrusion that extends radially and axially beyond the bearing bore wherein the protrusion comprises a radius that exceeds the bearing bore compressor end radius to thereby deflect lubricant from the outer lubricant film layer radially outward, wherein the compressor end protrusion extends axially beyond the bearing bore to provide a space between a shoulder of the bearing bore and the compressor end protrusion for directing lubricant from the outer lubricant film layer radially outward and wherein the locating mechanism ensures the space between the shoulder of the bearing bore and the compressor end protrusion;
the shaft disposed in the bearing; and
a spacer disposed between a compressor wheel and the bearing wherein the spacer comprises an end surface located adjacent a surface of the protrusion and wherein the surface of the protrusion comprises a thrust surface at a radius that exceeds the bearing bore compressor end radius.

13. The rotating assembly of claim 12 wherein the spacer comprises a groove configured to receive a seal ring.

14. The rotating assembly of claim 13 wherein the protrusion directs lubricant from the outer lubricant film layer radially outward in a plane parallel to a plane defined by the seal ring.

15. A bearing assembly for a turbocharger comprising:
a center housing that comprises
a bearing bore that extends from a compressor end of the center housing to a turbine end of the center housing wherein the compressor end comprises a bearing bore compressor end radius and the turbine end comprises a bearing bore turbine end radius,
a boss with an aperture for receiving a locating pin and an inlet for lubricant; and
a multipiece bearing disposed in the bearing bore and forming an outer lubricant film between the bearing and the bearing bore wherein the multipiece bearing comprises
a central axis,
an internal bore to receive a shaft extending between a compressor end and a turbine end of the bearing and forming an inner lubricant film between the internal bore and the shaft,
a locating pin aperture located between axial ends of the bearing and engaging the locating pin to prevent rotation and translation of the bearing within the bearing bore,
an end protrusion that extends radially and axially beyond the bearing bore wherein the protrusion comprises a radius that exceeds a respective bearing bore end radius to thereby deflect lubricant from the outer lubricant film layer radially outward and
an additional end protrusion at the opposing end of the bearing wherein the additional end protrusion extends radially and axially beyond the bearing bore and wherein one piece of the multipiece bearing comprises one of the end protrusions and another piece of the multipiece bearing comprises the other end protrusion.

* * * * *